United States Patent [19]
Aschow

[11] Patent Number: 5,428,866
[45] Date of Patent: Jul. 4, 1995

[54] EXTRUDED MOUNTING PLATE FOR DETACHABLE HEAVY DUTY CASTER

[76] Inventor: James Aschow, 10952 Rio Ruso Dr., Windsor, Calif. 95492

[21] Appl. No.: 174,796

[22] Filed: Dec. 29, 1993

[51] Int. Cl.$^6$ ............................................. B60B 33/00
[52] U.S. Cl. .................................... 16/30; 248/221.3
[58] Field of Search ................... 16/29, 30; 190/18 A, 190/18 R; 280/79.11; 248/221.3, 221.4; 403/319, 327

[56] References Cited

U.S. PATENT DOCUMENTS

| | | | |
|---|---|---|---|
| 2,680,000 | 6/1954 | Pulver | 248/221.3 |
| 3,608,127 | 9/1971 | Lewin | 16/30 |
| 3,685,852 | 8/1972 | Wendorf | 16/29 |
| 3,935,613 | 2/1976 | Kaneko | 16/30 |
| 3,987,875 | 10/1976 | Szabo | 16/30 |
| 4,422,212 | 12/1983 | Sheiman | 16/30 |
| 4,589,530 | 5/1986 | Sher | 190/18 A |
| 4,817,237 | 4/1989 | Murphy | 16/30 |

FOREIGN PATENT DOCUMENTS

| | | | |
|---|---|---|---|
| 62-163803 | 7/1987 | Japan | 16/30 |
| 2047519 | 12/1980 | United Kingdom | 248/221.3 |

Primary Examiner—Lowell A. Larson
Assistant Examiner—Donald M. Gurley
Attorney, Agent, or Firm—James E. Eakin; Janet K. Castaneda

[57] ABSTRACT

A mounting plate for detachably fixing a heavy duty, normally permanently attached, swivelling base plate caster roller unit to an object to be transported is cut from an extrusion shaped to form a flat bottom plate with raised parallel sides each including an overhanging flange such that parallel grooves are provided into which the caster's swiveling base plate can slide. Attachment of the mounting plate to the transportable object utilizes at least two mounting pins (screws, bolts or rivets), at least one of which protrudes from the mounting plate inside surface to form a stop to prevent the swivel plate from sliding all the way through. A spring loaded button, which becomes flush with the mounting plate when depressed, allows the caster swivel plate to enter the cavity provided by the parallel extruded grooves and the protruding mounting stop. When released, the spring loaded button protrudes from the mounting plate surface such that the cavity is now closed on all four sides and the caster's swivel plate is securely attached. Chamfered edges on the side walls and flanges allow the mounting plate to act as a glide when the caster is removed therefrom.

2 Claims, 2 Drawing Sheets

EXTRUDED MOUNTING PLATE FOR DETACHABLE HEAVY DUTY CASTER

FIELD OF THE INVENTION

The present invention relates to apparatus for mounting casters to furniture, luggage and the like. More particularly, the invention relates to a mounting plate for removably attaching a heavy duty caster to a cabinet.

BACKGROUND OF THE INVENTION

Apparatus for attaching casters to luggage and the like are well known in the prior art. Generally, such apparatus provides for easy attachment and detachment of the caster without requiring the use of tools. In the luggage industry, the design criteria generally stress economical manufacture of large quantities of light duty parts. Molded plastic systems predominant in the industry because, once the cost of the injection tooling has been absorbed, the mounting apparatus can be produced very cheaply. The best of the molded plastic systems in the luggage industry typically are one-piece systems requiring no assembly other than attachment of the system to the luggage. Such luggage mounting plate systems are described in U.S. Pat. Nos. 4,817,237 and 3,935,613.

Conventional detachable casters used for heavier objects, medium duty casters, are typically of the stem and socket type, as opposed to the swiveling plate mount type. As the stem caster wheel encounters bumps during use, the stem pounds against the inside of the socket thereby causing the stem to loosen in the socket after use to traverse rough surfaces. A further disadvantage of stem mounted casters is that they necessitate deep penetration into the object to which they are mounted.

There has long existed a need among musicians and public address sound contractors for a caster system that is both heavy duty and easily removable. It is not uncommon for speaker cabinets to weigh well over 100 lbs. and to require transportation over various—often rough—surfaces once or twice per day. Additionally, it is essential that the casters be easily removable to prevent unwanted rattling and movement during performances.

Furthermore, the economics of the musical performance manufacturing sector are virtually the opposite of the luggage industry in that volume is very low, but performance expectations are very high. One has only to witness the load-in and load-out of a major touring act to understand that the feverish pace of activity usually precludes careful handling of the equipment. Casters, unless they are the heavy-duty swivel plate type, are among the first casualties. Unfortunately conventional, heavy-duty swivel plate casters derive much of their endurance from the fact that they are not intended to be removable.

A heretofore unmet need exists for a easily removable heavy duty castor for attachment to cabinets, public address systems and the like.

SUMMARY OF THE INVENTION WITH OBJECTS

A general object of the invention is to provide an improved, detachable caster mounting system that overcomes the shortcomings of the limitations and drawbacks of the prior art.

A specific object of the invention is to provide a detachable mounting system for conventional swiveling plate mounted casters readily available in various grades of quality and service duty while generally utilizing a swiveling plate of uniform dimensions.

Another specific object of the invention is to provide a mounting plate having an extrudable shape because extrusion dies are relatively inexpensive and easily may be sized to provide the necessary strength to securely mount any of the several readily-available, heavy-duty, swivel plate mount casters.

Yet another specific object of the invention is to provide a mounting plate for a detachable roller caster having chamfered edges to enable the mounting plate to act as a glide when the caster is removed and the mounting plate is attached to an article of furniture or the like.

A substantially rectangular extruded mounting plate defines a channel cavity formed by two substantially symmetrical, parallel raised edges on opposed sides, each raised edge also including a flange oriented substantially parallel to the bottom of the plate such that grooves are formed to embrace the opposite sides of a swiveling base plate of the caster roller.

Attachment pins to attach the mounting plate to the cabinet or the like are mounted through the planar face of the channel cavity and at least one of the attachment pins additionally acts as a protruding backstop to close off one of the two open ends of the extrusion cavity.

A spring loaded button is also mounted through the planar face of the channel cavity and, when depressed, is flush with, or recessed slightly from, the inside bottom surface of the extruded channel thereby allowing the caster swiveling base plate to enter the channel cavity by sliding under the flanges. When released, the spring causes the button to extend and protrude above the bottom surface thereby securing the swivelling base plate inside the cavity of the mounting plate. When the caster is removed from the mounting plate, chamfered edges thereon allow the plate to act as a glide when attached to an article of furniture or the like.

These and other objects, advantages and features of the present invention will become more apparent upon considering the following detailed description of a preferred embodiment, presented in conjunction with the accompanying drawings.

DESCRIPTION OF PREFERRED EMBODIMENTS

Figure 1:
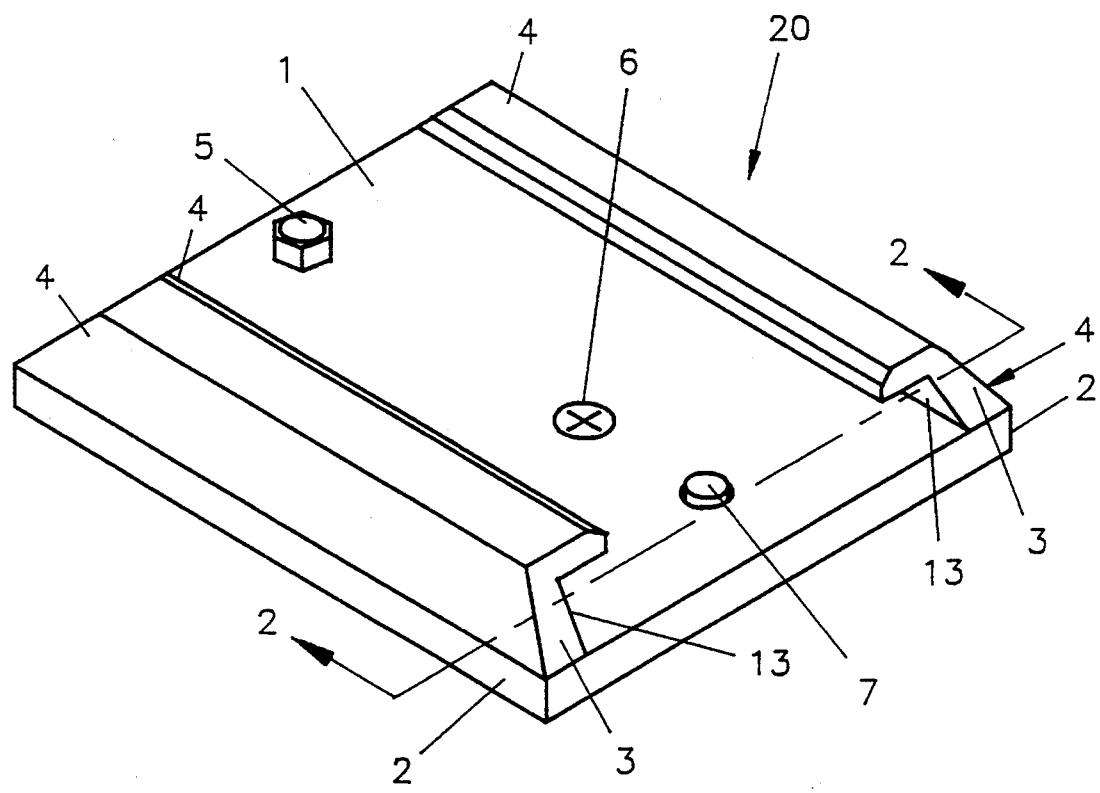
FIG. 1 is an elevated perspective view of the extruded mounting plate of the present invention and showing the attachment pins and spring loaded button.

An extruded mounting plate for attaching a heavy duty caster to a cabinet or the like is shown in FIG. 1 generally as reference numeral 20 and defining a substantially rectangular, planar, inside bottom surface 1.

A pair of raised, parallel side walls 2 extend along and from two opposite sides of the bottom surface 1. Each side wall 2 is capped with a pair of symmetrical flanges 3 oriented parallel to the inside bottom surface 1. The combination of inside bottom surface 1, the raised edges 2, and the flanges 3 forms a pair of parallel grooves 13 to embrace the swiveling base plate 32 of the caster roller unit 30 as best shown in FIG. 3.

Chamfered edges 4 are provided to enable the extrusion plate 20 to function as a glide after the caster roller 30 is removed.

Figure 3A:
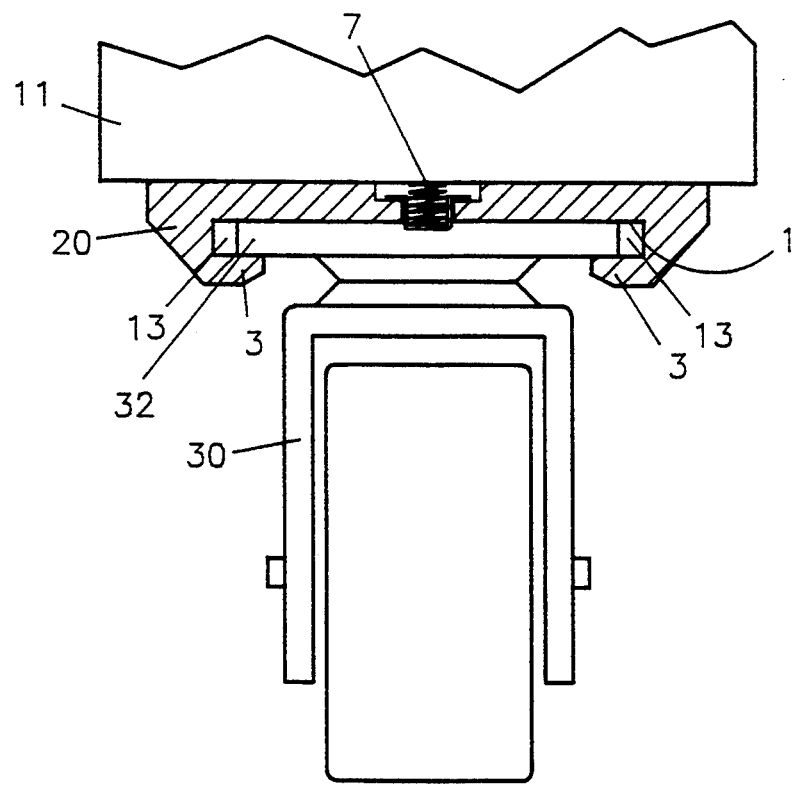
FIG. 3A is a end view in partial sectional of a mounting plate attached to a cabinet and having a caster attached thereto. The button is shown in its extended position to prevent the swivel plate of the caster from sliding through the mounting plate.
Figure 3B:
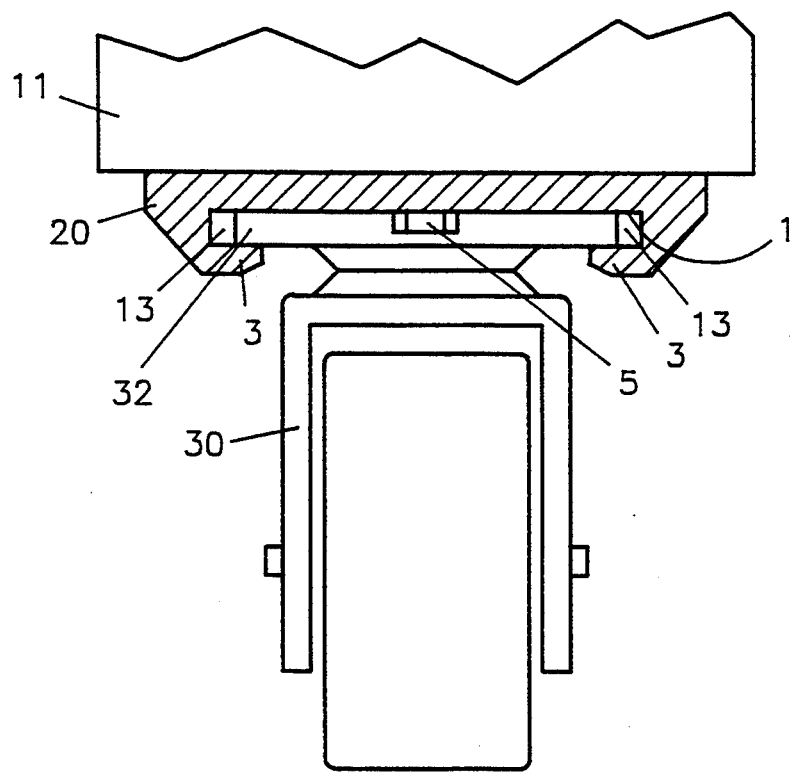
FIG. 3B is an opposite end view of the FIG. 3 embodiment showing the head of the attachment screw acting as a stop for the swivel plate of the caster.

An attachment pin 5 with a protruding head, preferably a threaded nut and bolt or a lag screw with a hexagonal head, extends through an aperture in the inside bottom surface 1 for attaching the mounting plate 20 to a cabinet 11 or the like as best shown in FIG. 3. The protrusion of the head of the attachment pin 5 serves as a backstop preventing the swiveling base plate 32 of the caster 30 from sliding all the way through the mounting plate 20, as best shown in FIG. 3B.

A second attachment device 6, which does not protrude above the inside bottom surface 1, is preferably a threaded nut and bolt or a lag screw with a counter sunk flat top head. Although experience has shown that the two large attachment screws 5,6 are sufficient, it can be seen that another virtue of the invention is the ease with which three, four, or more attachment devices could be accommodated in the basic extruded mounting plate 20 where unusually severe operating conditions are anticipated.

Figure 2:
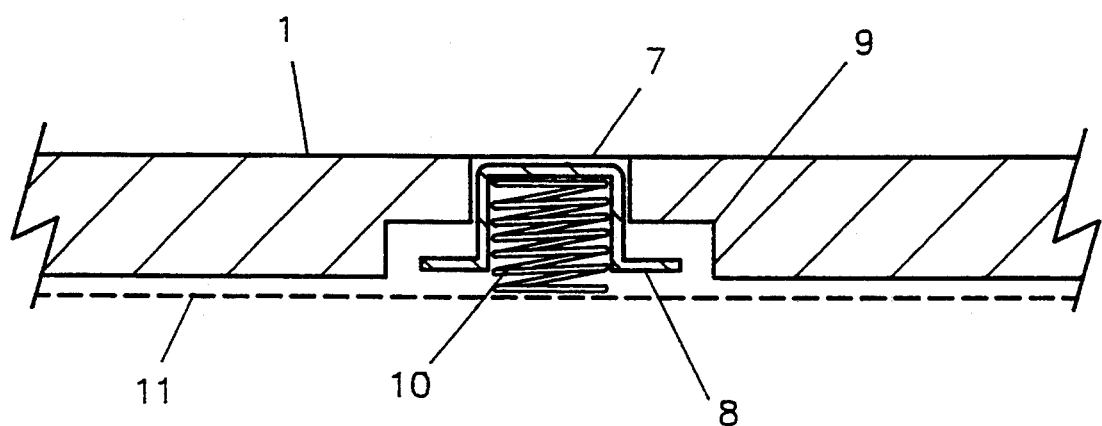
FIG. 2 is a sectional view of the extrusion plate taken along line 2—2 and showing the spring loaded release button in detail.

Referring now to FIG. 2, the cutaway section 2—2 illustrates the mounting details of the spring loaded release button 7. The bottom edge of the button cap 7 terminates in a flange 8 which, in combination with a counter bored shoulder 9 defined in the mounting plate 20, secures the button 7 to the mounting plate 20. The longitudinal dimension of the button cap 7 in combination with the depth of the counterbore are such that, when depressed as shown, the top of the button is flush with or slightly recessed beneath the extrusion plate's bottom surface 1, thus allowing the swivel plate 32 of the caster 30 to freely slide through the channels 13 onto the inside surface 1. Once fully in place, the spring 10 causes the button cap 7 to extend above inside surface 1, as shown in FIG. 3A, thus confining the swivel plate 32 securely between the edges 2, the flanges 3, the back stop 5 and the spring loaded release button 7.

FIG. 2 also illustrate that, with the exception of the attachment devices 5 and 6, the mounting plate system 20 of the present invention requires no further penetration of the surface 11 of the object to be transported.

Referring now to FIG. 3A, the mounting plate 20 of the present invention is shown in cross section attached to a cabinet 11 and having a conventional, swivel plate 32 of a heavy duty caster 30 mounted thereto. The spring button 7 is extended to secure the position of the swivel plate 32 at one mounting edge the mounting plate. FIG. 3B illustrates the opposite end of the mounting plate 20 having the attachment device 5 with the protruding head to secure the swivel plate 32 at the opposed mounting edge.

By means of the present invention, any heavy transportable object may be equipped to allow rapid and easy attachment and removal of heavy duty caster rollers. In the event such casters become damaged or worn, they may be readily replaced with new or different casters without the use of tools. Additionally, the only permanent connection placed on the cabinet or other object to be transported, is the low-profile, lightweight, rattle-free extrusion mounting plate 20 which, with its chamfered edges 4, doubles as a glide when caster rollers are not used.

While the present disclosure describes and illustrates many features and benefits of a preferred embodiment, it will be understood that various modifications could be made in the construction or assembly and that the invention is in no way limited to the embodiment shown here. For example, a resilient leaf spring could be substituted for the spring loaded button, or a separate protruding back stop may be provided which is not also part of a mounting device. The description and the disclosures present herein are by way of illustration only and should not be considered to limit the present invention, the scope of which is more particularly set forth in the following claims:

What is claimed is:

1. A detachable roller caster mounting system comprising an extruded, substantially rectangular mounting plate having a bottom wall, a pair of spaced upstanding side walls having opposed flanges extending parallel to the bottom wall, the bottom wall and side walls and parallel flanges forming a pair of parallel grooves for slidably mounting a swivelling base plate of a detachable roller caster; at least two attachment devices extending through the bottom wall for attaching said extruded plate to a transportable object, at least one of the attachment devices protruding from the bottom wall to form a stop near one end of the grooves for limiting sliding motion of a swivel base plate in the grooves; and spring loaded means extending through a hole in the bottom wall near the other end of the grooves and having a first operating position for allowing the base plate to slidably mount on the bottom wall and a second extended operating position for securing the base plate within the grooves of the rectangular mounting plate.

2. The mounting system of claim 1 further comprising chamfered edges on the side walls and the flanges for allowing the mounting plate, when a caster roller is removed, to act as a glide when attached to the transportable object.

* * * * *